Feb. 26, 1957 — E. L. McMULLIN — 2,782,547
FISHING ROD HANDLE AND REEL SEAT
Filed May 26, 1955
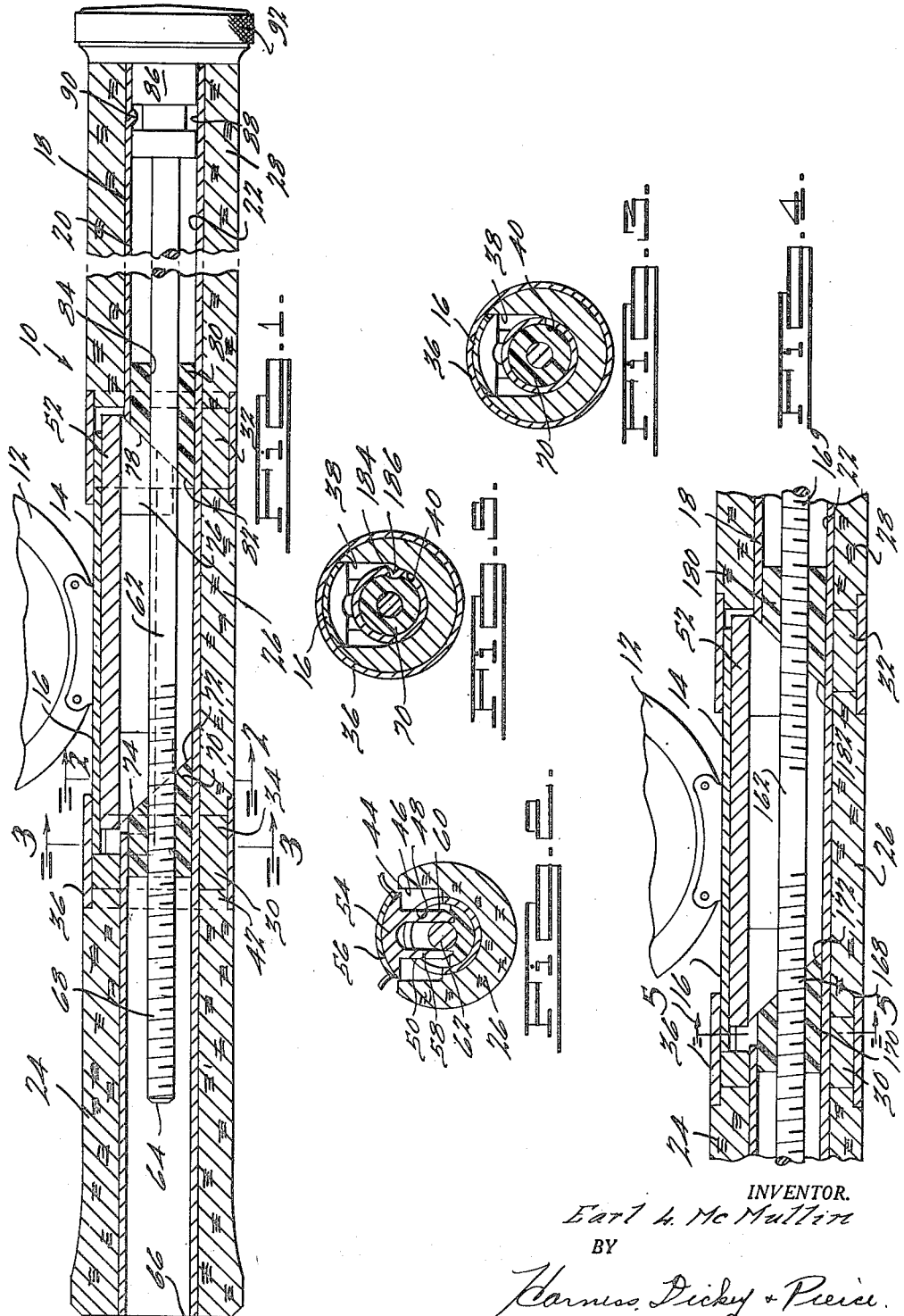
INVENTOR.
Earl L. McMullin
BY
Harness, Dickey & Pierce
ATTORNEY.

United States Patent Office 2,782,547
Patented Feb. 26, 1957

2,782,547

FISHING ROD HANDLE AND REEL SEAT

Earl L. McMullin, Hastings, Mich., assignor to Orchard Industries, Inc., Hastings, Mich., a corporation of Michigan Application May 26, 1955, Serial No. 511,161

8 Claims. (Cl. 43—22)

This invention relates to fishing rods and, more particularly, to an improved fishing rod handle construction.

An object of the invention is to overcome disadvantages in prior fishing rod handles and to provide an improved fishing rod handle incorporating improved means for positively clamping a fishing reel thereto.

Another object of the invention is to provide an improved fishing rod handle incorporating improved reel clamping means which is unobtrusive and which permits the user to grasp substantially the entire periphery of the handle when a reel is clamped thereon.

Another object of the invention is to provide an improved fishing rod handle that is pleasing in appearance, economical to manufacture and assemble, durable, efficient and reliable in operation.

Another object of the invention is to provide an improved fishing rod handle which may be utilized on spinning rods, fly rods, salt water rods and the like.

The above as well as other objects and advantages of the present invention will become apparent from the following description, the appended claims and the accompanying drawing wherein:

Figure 1 is a longitudinal sectional view of one embodiment of the invention, showing the same in installed relationship with respect to a fragmentarily illustrated reel;

Fig. 2 is a transverse sectional view of the structure illustrated in Fig. 1, taken on the line 2—2 thereof;

Fig. 3 is a transverse view of the structure illustrated in Fig. 1, taken on the line 3—3 thereof;

Fig. 4 is a fragmentary longitudinal sectional view of another embodiment of the invention; and Fig. 5 is a transverse sectional view of the structure illustrated in Fig. 4, taken on the line 5—5 thereof.

Referring to the drawing, and more particularly to Figs. 1–3, one embodiment of the invention is shown incorporated in a fishing rod handle, generally designated 10, which is shown in installed relationship with respect to a fragmentarily illustrated reel 12. The reel 12 is shown as being provided with oppositely directed support legs 14 and 16 which extend in a direction substantially parallel to the longitudinal axis of the fishing rod handle 10.

The handle 10 is comprised of an elongate, substantially straight tubular member 18 having a wall 20 which defines a substantially cylindrical bore 22 open at each end. The tubular member 18 may be formed of aluminum, brass or other suitable material having sufficient strength to withstand the forces exerted thereon. The left end portion of the bore 22, as viewed in Fig. 1, is adapted to receive one end portion of a fishing rod (not shown) as, for example, a conventional fiber glass rod. In order that the handle may be gripped conveniently, a plurality of resilient sleeve elements 24, 26 and 28 are provided which may be formed of cork or other suitable material. The tubular member 18 extends through the sleeve elements 24, 26 and 28, and the sleeve elements are cemented or otherwise secured to the tubular member so as to substantially prevent relative rotation therebetween.

A pair of seat members 30 and 32 are mounted on the tubular member 18, the seat member 30 being interposed between the sleeve 24 and the sleeve 26, while the seat member 32 is interposed between the sleeve 26 and the sleeve 28. Each of the seat members 30 and 32 includes a body portion 34 and an annular band portion 36, the band portion 36 of each seat member extending annularly around the body portion 34 and the edges of the band portion 36 terminating in longitudinally spaced relationship with respect to the body portion 34 so as to spacedly encompass the tubular member. Each of the body portions 34 defines a recess 38 which communicates with a bore 40 defined by the body portion, the tubular member 18 extending through the bore 40 of each body portion 34.

The end portions of the sleeve members 24, 26 and 28 adjacent the band portions 36 are reduced in diameter, as at 42, so that the band portions 36 overlap the adjacent sleeve members and protect the ends thereof. With such a construction, the periphery of each of the sleeve members 24, 26 and 28 is substantially flush with the periphery of the band portions 36 of each of the members 30 and 32, thereby facilitating the gripping of the handle 10.

The wall of the central sleeve member 26 is cut away, as at 44, so as to define a longitudinally extending opening 46 which is open at the top of the handle, as viewed in Figs. 1 and 2, and which communicates with the bore of the sleeve 26. The wall 20 of the tubular member 18 is also cut away, as at 48, so as to provide an aperture 50 which is aligned with the opening 46 and which communicates with the bore 22 of the tubular member. A clamping element 52 is provided which is fitted in the opening 46, the opposite end portions of the clamping element being disposed in the recesses 38 defined by the seat elements 30 and 32. The clamping element 52 includes a body portion 54 having an arcuate surface 56, the curvature of which corresponds to the curvature of the periphery of the handle. A pair of integral leg portions, such as 58 and 60, are provided at the opposite end portions of the body portion 54 of the clamping element 52, the leg portions 58 and 60 projecting through the aperture 50 provided in the tubular member 18 and straddling an elongate screw 62. The screw 62 extends axially of the tubular member 18, the end 64 of the screw terminating in spaced relationship with respect to the end 66 of the tubular member so that the screw does not interfere with the reception of the fishing rod into the bore 22 of the tubular member.

In this embodiment of the invention, the left end portion of the screw, as viewed in Fig. 1, is provided with external threads 68 adapted to threadably engage an internally threaded cylindrical traveling jaw element 70 which is preferably formed of nylon or other suitable material. The jaw element 70 is provided with a beveled cam surface 72 on the inner end thereof which is adapted to bear against beveled cam surfaces 74 provided on the leg portions 58 and 60, the cam surfaces 72 and 74 being inclined with respect to the longitudinal axis of the tubular member. The right end portion of the clamping element 52 is provided with a pair of leg portions 76 similar to the leg portions 58 and 60, the leg portions 76 having beveled cam surfaces 78 thereon, and straddling the screw 62.

In this embodiment of the invention a jaw element 80 is provided having a beveled cam surface 82 adapted to engage the cam surfaces 78 of the leg portions 76. The jaw element 80 is also preferably formed of the same material as the jaw element 70 and defines a bore 84 through which the screw 62 passes freely.

As previously mentioned, the screw 62 threadably engages the jaw element 70. The element 70 is mounted for sliding movement in the bore 22 of the tubular member 18 and it is preferred that the frictional forces between the periphery of the element 70 and the tubular member 18 be greater than the frictional forces between the internal threads of the element 70 and the external threads of the screw 62. With such a construction, rotation of the screw 62 imparts longitudinal movement to the jaw element 70 without effecting rotation of the jaw element. As previously mentioned, the jaw element 80 does not threadably engage the screw 62, the element 80 being fixed in a predetermined position in the bore 22 of the tubular member 18 so that longitudinal movement is not imparted to the jaw element 80 upon rotation of the screw 62. The right end portion of the screw, as viewed in Fig. 1, is provided with a head portion 86 which defines an annular groove 88 into which a dimple 90 projects, the dimple 90 being formed in the wall 20 of the tubular member 18. With such a construction, relative longitudinal movement between the screw 62 and the tubular member 18 is prevented. A knurled knob 92 is fixed to the head portion 86 of the screw 62, the knob 92 facilitating rotation of the screw 62 and also serving as a butt element for a handle.

In the operation of this embodiment of the invention, the supporting leg portions 14 and 16 of the reel are inserted in the opening 46 so that the end portions of the legs 14 and 16 are disposed between the clamping element 52 and the band portions 36 of the seat members 30 and 32. The knob 92 is then rotated so as to move the element 70 longitudinally of the screw toward the element 80. As the element 70 moves toward the element 80, the cam action of the beveled surfaces 72 and 82 engaging the surfaces 74 and 78 of the leg portions of the clamping element forces the clamping element to move angularly upwardly, as viewed in Fig. 1, into clamping relationship with respect to the supporting legs 14 and 16 of the reel so that the legs 14 and 16 are positively clamped between the clamping element 52 and the band portions 36. The reel may be quickly removed from the handle by reversing the direction of rotation of the screw so that the clamping member is permitted to move angularly inwardly as the jaw element 70 moves longitudinally of the bore 22.

Another embodiment of the invention is illustrated in Figs. 4 and 5. This embodiment of the invention includes the tubular member 18, the sleeves 24, 26 and 28, the seat elements 30 and 32, and the clamping element 52. In this embodiment of the invention, a screw 162 is provided, one end portion of which is provided with right hand external threads 168 while the opposite end portion is provided with left hand threads 169. A jaw element 170 is provided having internal threads adapted to mate with the threads 168, and a jaw element 180 is provided having internal threads adapted to mate with the left hand threads 169. The jaw elements 170 and 180 are provided with beveled cam surfaces 172 and 182, respectively, adapted to engage the cam surfaces 74 and 78 provided on the leg portions of the clamping element 52. As shown in Fig. 5, in this embodiment of the invention each of the elements 170 and 180 is provided with a longitudinally extending groove 184 which extends longitudinally of the elements 170 and 180 in a direction substantially parallel to the longitudinal axis of the screw 162. The wall 20 of the tubular member is provided with a pair of longitudinally spaced dimples 186 which project into the grooves 184 so as to prevent relative rotational movement between the jaw elements 170 and 180 and the tubular member 18 while permitting longitudinal movement of the jaw elements relative to the tubular member.

In the operation of this embodiment of the invention, the supporting legs 14 and 16 of the reel are interposed between the clamping element 52 and the band portions 36 of the seat members 30 and 32, in the manner previously described. The screw 162 is then rotated so that the left and right hand threaded portions of the screw simultaneously move the jaw elements 170 and 180 longitudinally of the screw 162 toward each other. As the jaw elements 170 and 180 move toward each other, the surfaces 172 and 182 engage the surfaces 74 and 78 provided on the leg portions of the clamping element 52 and move the clamping element 52 radially outward in a direction substantially perpendicular to the longitudinal axis of the screw 162 to clamp the legs 14 and 16 securely between the clamping element 52 and the band portions 36 of the seat members. The reel 12 may be readily removed from the handle by reversing the direction of rotation of the screw 162 so that the clamping element 52 moves radially inwardly a sufficient distance to provide clearance for the removal of the legs 14 and 16.

While preferred embodiments of the invention have been shown and described, it will be understood that various changes and modifications may be made without departing from the spirit of the invention.

What is claimed is:

1. In a fishing rod handle, means for positively clamping a reel to said handle comprising, in combination, a tubular member having a wall defining a bore, said wall of said tubular member also being provided with an aperture which communicates with the bore of the tubular member intermediate the ends thereof, a pair of seat members carried by said tubular member at opposite ends of the aperture in the wall of said tubular member, each of said seat members having an annular band portion spacedly encompassing said tubular member and a body portion defining guideways extending inwardly of said band portion, a clamping element including a body portion extending between said seat members, the opposite ends of said body portion of said clamping element being disposed in the guideways defined by said seat members, said clamping element also including a plurality of transversely projecting cam portions extending through the aperture in the wall of said tubular member and terminating in the bore of said tubular member, a pair of jaw elements mounted in the bore of said tubular member in longitudinally spaced relationship, each of said jaw elements having a cam surface engageable with the cam portions of said clamping element, and means for moving said jaw elements into engagement with said cam portions of said clamping element to effect transverse movement of said clamping element relative to said band portions of said seat members.

2. In a handle for fishing rods and the like, means for positively clamping a reel to said handle comprising a tubular member having a wall defining a bore, said wall of said tubular member also being provided with an aperture which communicates with the bore of said tubular member, a pair of annular seat members carried by said tubular member at opposite ends of the aperture in the wall of said tubular member, each of said seat members having an annular band portion spacedly encompassing said tubular member and a body portion defining guideways extending inwardly of said band portion, a clamping element extending between said seat members, said clamping element having a body portion disposed intermediate said band portions and said tubular member, the opposite ends of said body portion of said clamping element being disposed in the guideways defined by said seat members, said clamping element also having a plurality of transversely projecting cam portions extending through the aperture in the wall of said tubular member and terminating in the bore of said tubular member, a pair of jaw elements mounted in the bore of said tubular member in longitudinally spaced relationship, said jaw elements having a cam surface engageable with the cam portions of said clamping element, and means for moving said jaw elements into engagement with said cam portions of said clamping element to effect transverse movement of said clamping element relative to said band portions of said seat members.

3. In a fishing rod handle, means for positively clamping a reel to said handle, including, in combination, a tubular member having a wall defining a bore, said wall of said tubular member also being provided with an aperture which communicates with the bore of said tubular member, a pair of annular seat members carried by said tubular member at opposite ends of the aperture in the wall of said tubular member, each of said seat members having an annular band portion spacedly encompassing said tubular member and a body portion defining guideways extending inwardly of said band portion, a clamping element extending between said seat members, said clamping element having a body portion disposed intermediate said band portions and said tubular member, the opposite ends of said body portion of said clamping element being disposed in the guideways defined by said seat members, said clamping element also having a plurality of transversely projecting cam portions extending through the aperture in the wall of said tubular member and terminating in the bore of said tubular member, a pair of jaw elements mounted in the bore of said tubular member in longitudinally spaced relationship, each of said jaw elements having a cam surface engageable with the cam portions of said clamping element, and screw means disposed within the bore defined by said tubular member and threadably engageable with at least one of said jaw elements, said screw means being operable to effect movement of said one jaw element longitudinally of said tubular member relative to the other jaw element whereby said jaw elements engage said cam portions of said clamping element and move said clamping element relative to said band portions of said seat members.

4. In a fishing rod handle, the combination comprising a tubular member having a wall defining a bore, said wall of said tubular member also being provided with an aperture which communicates with the bore of said tubular member, means for positively clamping a reel to said handle including a pair of spaced jaw elements mounted in the bore of said tubular member in longitudinally spaced relationship, each of said jaw elements having a cam surface thereon, an elongate screw extending axially of the bore of said tubular member and threadably engaging at least one of said jaw elements, a clamping element having a portion thereof extending through the aperture in the wall of said tubular member and spacedly straddling said screw, said portion of said clamping element having cam surfaces thereon adapted to engage the cam surfaces of said jaw elements, and a pair of seat members carried by said tubular member on opposite ends of the aperture in the wall of said tubular member, said seat members each having an annular band portion spacedly encompassing said tubular member.

5. In a fishing rod handle, means for positively clamping a reel to said handle comprising a tubular member having a wall defining a bore, said wall of said tubular member also being provided with an aperture which communicates with the bore of said tubular member, a pair of spaced jaw elements mounted in the bore of said tubular member in longitudinally spaced relationship, said jaw elements each having a cam surface thereon, an elongate screw extending axially of the bore of said tubular member and threadably engaging at least one of said jaw elements, a clamping element having a portion thereof extending through the aperture in the wall of said tubular member and spacedly straddling said screw, said portion of said clamping element having a cam surface thereon adapted to engage the cam surfaces of said jaw elements, a pair of seat members carried by said tubular member at opposite ends of the aperture in the wall of said tubular member, said seat members each having an annular band portion spacedly encompassing said tubular member and a body portion defining guideways extending inwardly of said band portion, the opposite ends of said clamping element being disposed in the guideways defined by said seat members, and a plurality of resilient sleeve members mounted on said tubular member, at least one of said sleeve members defining an aperture which is aligned with the aperture in the wall of said tubular member, the peripheral surfaces of said sleeve members being substantially flush with the peripheral surfaces of said band portions.

6. In a fishing rod, the combination comprising a tubular member having a wall defining a bore, said wall of said tubular member also being provided with an aperture which communicates with the bore of said tubular member intermediate the ends thereof, a pair of spaced jaw elements mounted in the bore of said tubular member in longitudinally spaced relationship, each of said jaw elements having a cam surface thereon inclined with respect to the longitudinal axis of the bore of said tubular member, an elongate screw extending axially of the bore of said tubular member, said screw threadably engaging said jaw elements so as to effect simultaneous movement of said jaw elements in opposite directions, a clamping element having a plurality of leg portions extending through the aperture in the wall of said tubular member and on opposite sides of said screw in radially outwardly spaced relationship with respect to said screw, each of said leg portions having a cam surface thereon adapted to engage the cam surfaces of said jaw elements, a pair of seat elements carried by said tubular member at opposite ends of the aperture in the wall of said tubular member, each of said seat elements including an annular band portion spacedly encompassing said tubular member and a body portion defining guideways extending inwardly of said band portions, the opposite ends of said clamping element being disposed in the guideways defined by said seat members, means for preventing longitudinal movement of said screw relative to said tubular member, and a plurality of resilient sleeves mounted on said tubular member, at least one of said sleeves being interposed between said seat members and defining an opening which is aligned with the aperture in the wall of said tubular member.

7. In a fishing rod, the combination comprising a tubular member having a wall defining a bore, said wall of said tubular member also being provided with an aperture which communicates with the bore of said tubular member intermediate the ends thereof, a pair of spaced jaw elements mounted in the bore of said tubular member in longitudinally spaced relationship, each of said jaw elements having a cam surface thereon inclined with respect to the longitudinal axis of the bore of said tubular member, an elongate screw extending axially of the bore of said tubular member, said screw having right hand and left hand thread portions, respectively, threadably engaging said jaw elements so as to effect simultaneous movement of said jaw elements in opposite directions longitudinally of said screw, a clamping element having a plurality of leg portions extending through the aperture in the wall of said tubular member on opposite sides of said screw and in radially outwardly spaced relationship with respect to said screw, each of said leg portions having a cam surface thereon adapted to engage the cam surface of one of said jaw elements, a pair of seat elements carried by said tubular member at opposite ends of the aperture in the wall of said tubular member, each of said seat elements including an annular band portion spacedly encompassing said tubular member and a body portion defining guideways extending inwardly of said band portion, the opposite ends of said clamping element being disposed in the guideways defined by said seat members, means for preventing longitudinal movement of said screw relative to said tubular member, means for preventing angular movement of said jaw elements relative to said tubular member, and a plurality of resilient sleeves mounted on said tubular member, at least one of said sleeves being interposed between said seat members and defining an opening which is aligned with the aperture in the wall of said tubular member.

8. In a fishing rod handle, means for positively clamping a reel to said handle including, in combination, a tubular member having a wall defining a bore, said wall of said tubular member also being provided with an aperture which communicates with the bore of said tubular member, a pair of seat members carried by said tubular member at opposite ends of the aperture in the wall thereof, each of said seat members including an annular band portion spacedly encompassing said tubular member and a body portion defining guideways extending inwardly of said band portion, a clamping element including a body portion extending between said seat members, the opposite ends of the body portion of said clamping element being disposed in the guideways defined by said seat members, said clamping element also including a transversely projecting cam portion extending through the aperture in the wall of said tubular member and terminating in the bore of said tubular member, and actuating means disposed entirely within the bore of said tubular member and movable longitudinally thereof, said actuating means being engageable with said cam portion of said clamping element and being effective to move said clamping element transversely of said tubular member into clamping relationship with respect to said band portions of said seat members.

References Cited in the file of this patent

UNITED STATES PATENTS

| 258,902 | Eggleston | June 6, 1882 |
| 1,154,123 | Manning | Sept. 21, 1915 |
| 1,350,635 | Beaty | Aug. 24, 1920 |

FOREIGN PATENTS

| 1,038,421 | France | Sept. 28, 1953 |